United States Patent [19]

Rushing

[11] 4,148,504

[45] Apr. 10, 1979

[54] PROTECTIVE GUARD FOR PASSENGER VEHICLE

[76] Inventor: John D. Rushing, 4714 Lester Dr., Arlington, Tex. 76016

[21] Appl. No.: 784,526

[22] Filed: Apr. 4, 1977

[51] Int. Cl.² ............................................. B60R 21/02
[52] U.S. Cl. .................................... 280/756; 248/166; 296/102; D12/156
[58] Field of Search ................ 280/756, 748; 296/102; D12/155, 156, 88, 87, 98; 248/166, 168

[56] References Cited

U.S. PATENT DOCUMENTS

| D. 225,354 | 12/1972 | Gardner | D12/88 |
|---|---|---|---|
| 1,491,306 | 4/1924 | Kirkham | 296/102 |
| 2,263,981 | 11/1941 | Dalecke et al. | 280/756 X |
| 3,022,846 | 2/1962 | Thompson | D12/88 |
| 3,336,074 | 8/1967 | Barnes et al. | 280/756 X |
| 3,622,177 | 11/1971 | Notestine | 296/102 X |
| 3,918,740 | 11/1975 | Notestine | 296/102 X |
| 3,933,371 | 1/1976 | Graham | 296/102 X |

FOREIGN PATENT DOCUMENTS

| 1919360 | 8/1970 | Fed. Rep. of Germany | 280/756 |
|---|---|---|---|
| 559646 | 3/1975 | Switzerland | 296/102 |

Primary Examiner—Robert B. Reeves
Assistant Examiner—Michael J. Forman
Attorney, Agent, or Firm—Richards, Harris & Medlock

[57] ABSTRACT

To provide passenger protection when a vehicle rolls a protective guard is mounted juxtaposition the passenger seating arrangement. This protective guard includes a roll bar with a support brace hinged thereto. Both the roll bar and the support brace have cross members and leg members which are adjustable to meet the requirements of different vehicle designs and installations. At the end of the leg members for the support brace there is pivotally attached mounting pads, which along with mounting pads of the leg members of the roll bar, are used for attachment of the protective guard to the passenger vehicle.

6 Claims, 13 Drawing Figures

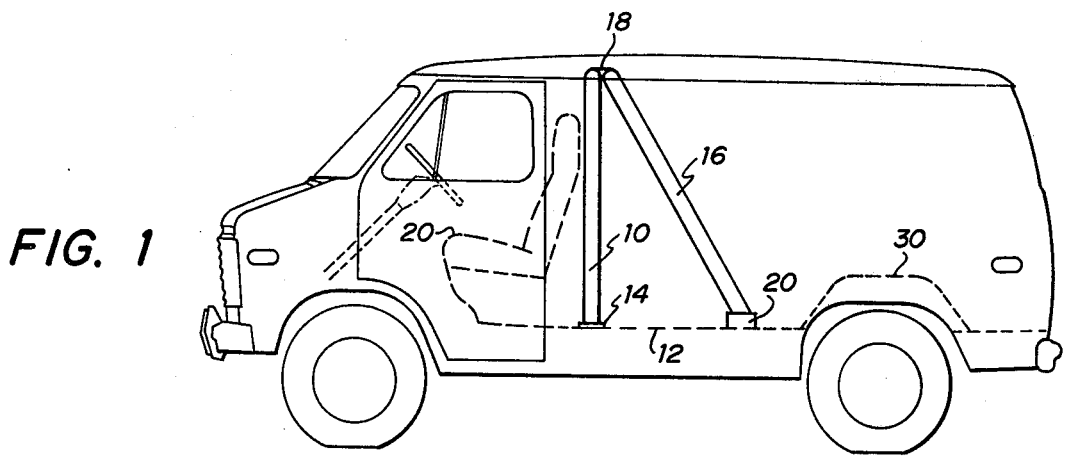
FIG. 1
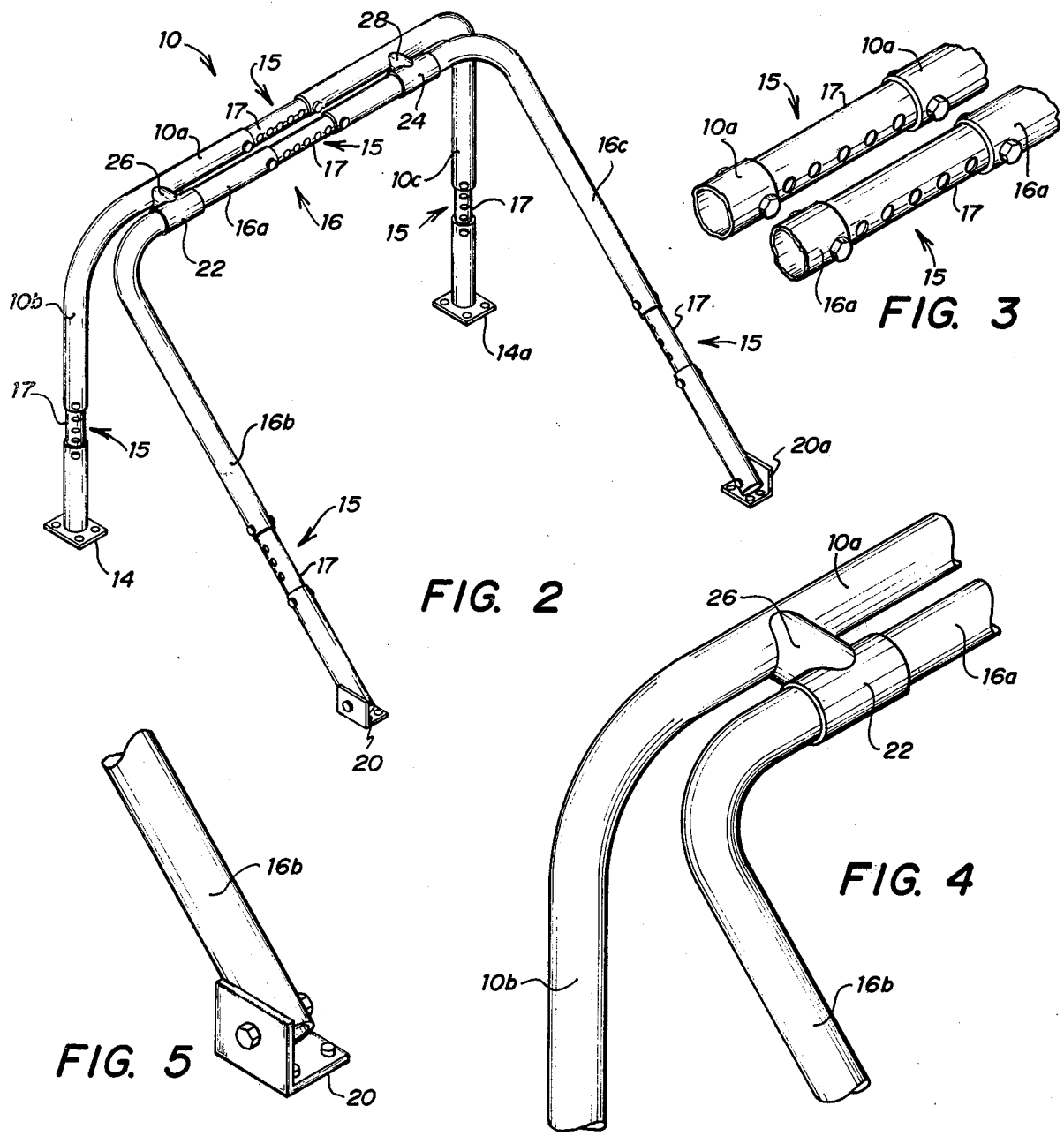

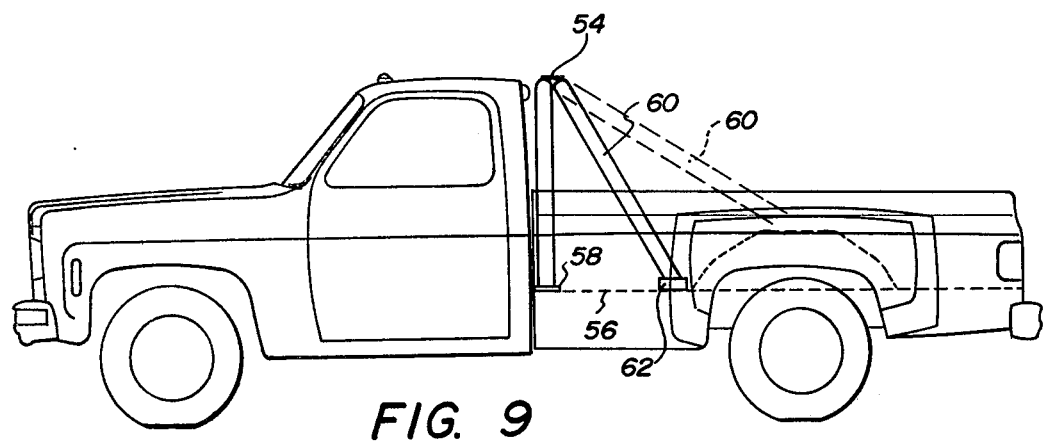
FIG. 9
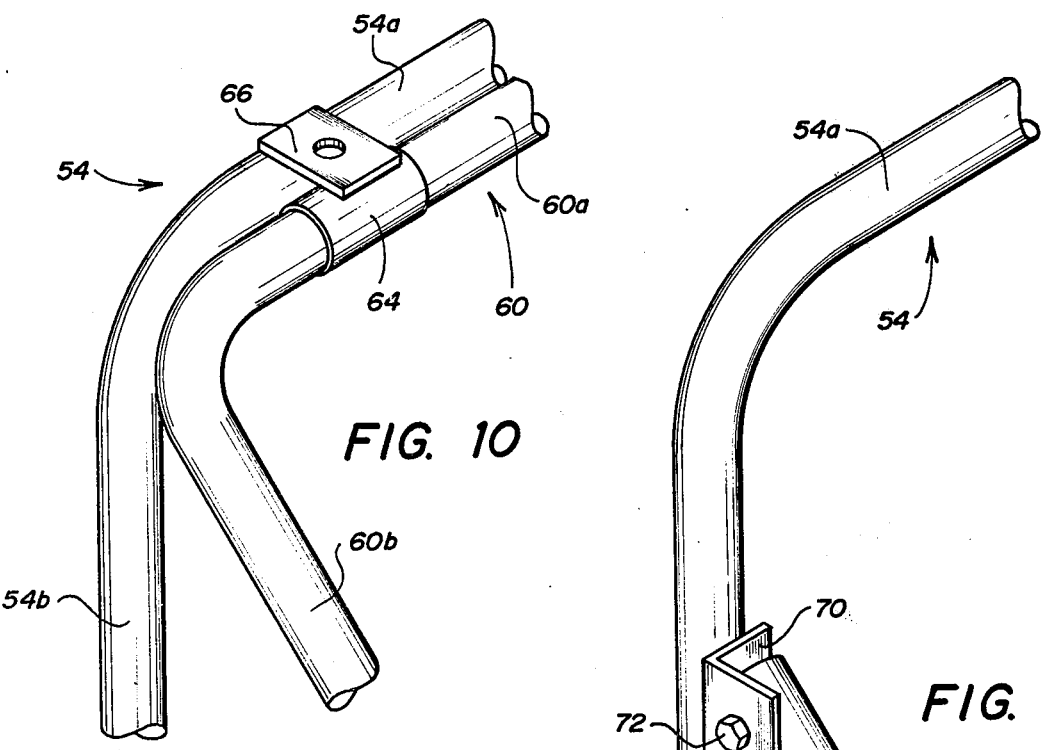
FIG. 10
FIG. 11
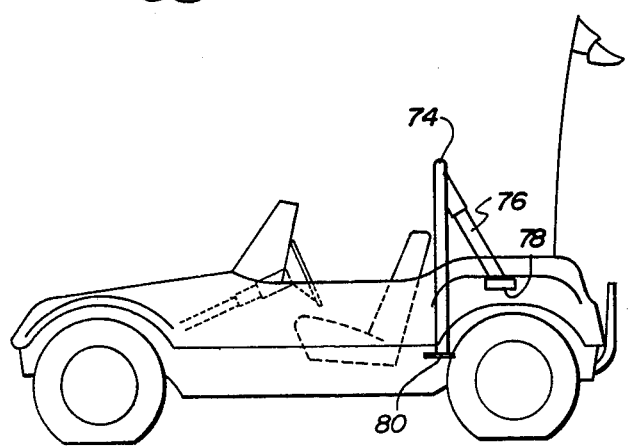
FIG. 12

PROTECTIVE GUARD FOR PASSENGER VEHICLE

This invention relates to a passenger guard protective device, and more particularly to a roll bar having adaptability to various vehicle configurations.

Passenger vehicles with a high vertical profile, or passenger vehicles when used "off-road" have an increased susceptibility to rolling over thereby subjecting passengers to injury as the vehicle weight may crush the passenger compartment. To reduce the possibility of injury protective guards have been mounted in the passenger compartment, usually immediately behind the seating arrangement. These protective guards are commonly known as "roll bars", and this term will be adopted in describing the protective guard of the present invention.

Heretofore, roll bars for passenger vehicles have been more or less custom made to fit the peculiar structural layout of a vehicle. Such tailoring of prior art roll bars has been required not only for installation in van type vehicles and pickup type vehicles, but also for such vehicles of different manufacturers.

While the tailoring of a roll bar to a particular vehicle provides the required protection, too often a vehicle owner tries to adapt a previously owned roll bar to a different vehicle. Such adaptation may or may not provide the protection required to reduce injury if the vehicle rolls. Further, such tailoring of roll bars for each vehicle considerably increases the expense to the vehicle owner because the supplier is required to manufacture and stock numerous models to fit various vehicle structures. Where each roll bar is individually manufactured to an owner's requirements, the savings of mass production cannot be realized.

In accordance with the present invention, there is provided a protective guard device for a passenger vehicle that is to be mounted juxtapositioned and transverse of a seating arrangement. The protective guard includes a generally U-shaped roll bar having a top member and two leg members. Also, the guard includes a generally U-shaped support brace having a top member and two leg members. A hinge with one part secured to the top member of the roll bar and a second part pivotally mounted to the top member of the support brace adjustably connects the roll bar to the support brace. Mounting pads are pivotally mounted to each of the leg members of the support brace at the end opposite the top member.

In accordance with another embodiment of the invention, there is provided a protective guard device that includes a generally U-shaped roll bar having a top member and two leg members with a first support brace hinged to one member of the roll bar and a second support brace hinged to a second member of the roll bar. Mounting pads are also pivotally mounted to each of the support braces at the end opposite the hinged pivotal connection to the roll bar.

A more complete understanding of the present invention and the advantages thereof may now be had by reference to the following description taken in conjunction with the drawings.

Referring to the drawings:

FIG. 1 is an outline drawing of a van type vehicle showing a passenger protective guard mounted immediately behind a seating arrangement;

FIG. 2 is a perspective view of the roll bar mounted in the vehicle of FIG. 1;

FIG. 3 is an expanded view of the expansion link of the cross members and leg members of the roll bar of FIG. 2;

FIG. 4 is an expanded view of the hinge section for pivotally mounting the roll bar to a support brace;

FIG. 5 is an expanded view of a mounting pad for one of the leg members of the support brace of FIG. 2;

FIG. 9 shows another embodiment of the passenger protective guard of the present invention mounted immediately to the rear of the passenger cab of a pickup truck;

FIG. 10 is an expanded view of the hinge joining the roll bar and support brace of the embodiment of FIG. 9;

FIG. 11 is an expanded view of an alternate embodiment for joining a support brace to roll bar members as shown in FIG. 6;

FIG. 12 illustrates a foreshortened construction for the embodiment of the protective guard of FIG. 6 mounted behind the seat arrangement in an off-the-road vehicle.

Figure 6:
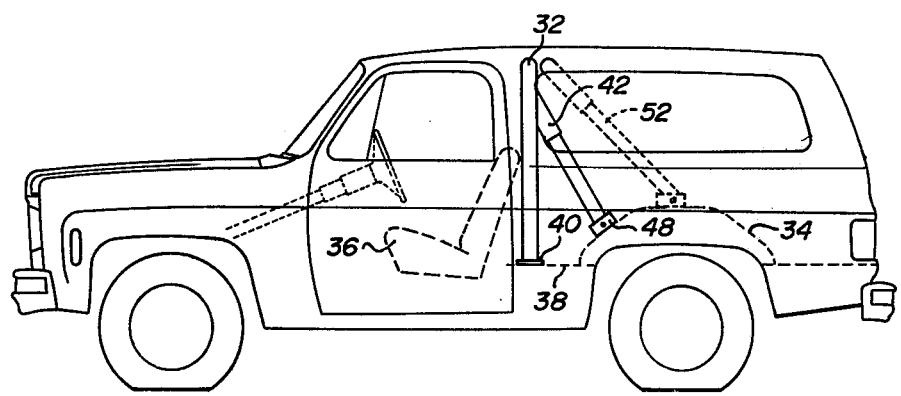
FIG. 6 is an outline view of a camper pickup showing another embodiment of the passenger protective guard of the present invention mounted juxtaposition a seating arrangement.

Various embodiments of the invention illustrated and described, while shown mounted to a particular vehicle style, may be used interchangeably on any of the passenger vehicles illustrated and other passenger vehicles wherein there is a need for roll bar protection.

Referring to FIG. 1, there is shown a van type passenger vehicle including a roll bar 10 mounted to the floor 12 by means of mounting pads, such as the mounting pad 14. The roll bar 10 is supported in the position shown by means of a support brace 16 connected by a hinge 18 to the roll bar and having mounting pads, such as the mounting pad 20, for securing to the floor 12 of the vehicle.

In the usual manner for mounting protective guard devices, the roll bar 10 is mounted immediately behind the seating arrangement for the driver and passengers of the vehicle. This provides protection and reduces the possibility of injury to the driver and passengers should some event occur that causes the vehicle to roll over.

Referring to FIGS. 2, 3 and 4, the roll bar 10 is hinge mounted to the support brace 16 by means of shortened pipe sections 22 and 24 that are respectively welded to spacers 26 and 28 that in turn are welded to the top member of the roll bar 10. As illustrated, the roll bar 10 has a generally U-shaped configuration and is constructed of pipe and includes a top member 10a and leg members 10b and 10c. At the lower end of the leg member 10b there is welded or otherwise secured the mounting pad 14 and at the lower end of the leg member 10c there was similarly secured a mounting pad 14a. The support brace 16 also has a generally U-shaped configuration and is constructed of pipe and includes a top member 16a and leg members 16b and 16c. At the lower end of the leg member 16b there is pivotally attached a mounting pad 20 and at the lower end of the leg member 16c there is pivotally attached a mounting pad 28a.

To provide a protective guard that may be mounted in either a vehicle of the type shown in FIG. 1 or the types shown in other Figures, the top and leg members of the roll bar 10 may include an adjustable link 15, such as detailed in FIG. 3. The adjustable link includes a pipe section 17 having an outside diameter smaller than the inside diameter of pipe sections of the two part top or leg members for the roll bar. The pipe section 17 includes spaced holes extending from both ends to provide an adjustable link in the various members of the roll bar 10. These holes receive bolts or other fasteners that pass through openings in the pipe sections. Thus, with the adjustable link 15 a roll bar may be used in either the van type vehicle of FIG. 1, the pickup truck vehicles of FIGS. 6 and 9 or the off-the-road vehicle of FIG. 12.

To further improve the adaptability of the protective guard of the present invention to various vehicle configurations, the adjustable link 15 may also be made a part of the top and leg members of the U-shaped support brace 16. Also, the adjustable link 15 may be made a part of the support brace for the subsequent embodiments to be described.

As shown in FIG. 5, for the leg member 16b, the mounting pad 20 has an L-shaped configuration with the upright part pivoted to the leg member 16b and with the horizontal foot adapted for mounting to the floor 12 of a vehicle.

For the embodiment of FIGS. 1–5, the foreshortened pipe sections 22 and 24 for hinging the support brace 16 to the roll bar 10, are constructed from pipe having an inside diameter larger than the outside diameter of the top member 16a. Thus, with the roll bar 10 mounted generally vertical with respect to the floor 12 the support brace 16 will rotate in the pipe sections 22 and 24 such that the mounting pads 20 and 20a may be bolted or otherwise secured to the floor 12. This permits various vehicle configurations to utilize the same model of protective guard. For example, assuming the vehicle of FIG. 1 had a shorter wheel base such that the fender well 30 was moved forward, then the mounting pads of the support brace 16 may be secured to the fender well without tailoring the construction of the protective guard.

Referring to FIG. 6, there is shown a protective guard where support braces for the roll bar 32 are illustrated mounted to various surfaces of a wheel well 34. The outline of the passenger vehicle shown in FIG. 5 is of a camper pickup with the roll bar 32 mounted behind the seating arrangement 36 for the passenger and driver of the vehicle. Where the vehicle includes a passenger cab, the roll bar 32 may be mounted outside the cab to the bed 38 of the truck illustrated.

Again, as illustrated by the roll bar 10 of FIG. 2, the roll bar 32 includes a top member and two leg members with each leg member having a mounting pad welded thereto, such as the mounting pad 40.

Figure 7:
FIG. 7 is an expanded view of the pivotal interconnection of the roll bar and a support brace of the embodiment of FIG. 6.

Referring to FIG. 7, there is shown an expanded view of the connection of one support brace to the roll bar 32. A support brace 42 is shown secured to a leg member 32a by means of a pipe section 44. The pipe section 44 is welded to the leg member 32a at an angle generally to be assumed by the support brace 42. This arrangement is not a pivot arrangement. This configuration allows for adjustment of the support member that may be required by the configuration as illustrated in FIGS. 5 and 11. The support brace 42 has spaced pin holes for mounting to the pipe section 44 by means of a pin 46.

It will be understood that the other leg member of the roll bar 32, not shown in FIGS. 6 or 7, will also require a support brace, such as the support brace 42. The same hinged arrangement, such as utilized by the pipe section 44, would secure this second support brace to the other leg member of the roll bar 32.

Figure 8:
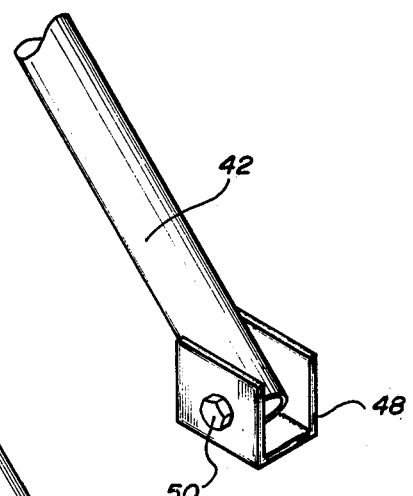
FIG. 8 is an expanded view of a mounting pad for one of the support braces of FIG. 6.

Referring to FIG. 8, there is shown an expanded view of the support brace 42 with a mounting pad 48 pivotally attached thereto by means of a pin 50. As illustrated, the mounting pad 48 has a generally U-shaped configuration with the upstanding arms receiving the pin 50 and the center member adapted for securing to the vehicle. As illustrated in FIG. 6, the mounting pad 48 is attached to the wheel well cover 34.

To emphasize the adaptability of the protective guard of the present invention to various vehicle configurations, the dotted outline illustration of FIG. 6 shows how the embodiment of the protective guard of FIG. 1 is mounted in a camper type vehicle where the support brace 52 has the general U-shaped configuration of the support brace 16 of FIG. 2. Thus, the protective guard of the two embodiments as thus far described may be interchangeably used on the various vehicles of the drawings.

Referring to FIG. 9, there is shown another embodiment of the invention where a roll bar 54 is mounted to the bed 56 of a pickup truck immediately behind the cab forming the passenger compartment. The roll bar 54 is secured to the bed 56 by means of mounting pads, such as the mounting pad 58, and is supported in position by means of a support brace 60 mounted to the bed 56 by means of mounting pads, such as the mounting pad 62.

Referring to FIG. 10, there is shown the hinge for rotatably mounting the support brace 60 to the roll bar 54. As in the embodiment of FIG. 2, both the roll bar 54 and the support brace 60 have a generally U-shaped configuration each with a top member and two leg members. The hinge in the embodiment of FIG. 10 includes two shortened pipe sections, such as the pipe section 64, secured to the top member 54a of the roll bar 54 by means of a mounting bracket 66, which may also serve as a support for lights or other accessories.

A hinge construction similar to that shown in FIG. 10 would be required for the right side of the top member 60a of the support brace 60. Thus, the overall structure is similar to that shown in FIG. 2 with the alternate hinge including the pipe section 64 and the bracket 66. Mounting pads for the leg members of the support brace 60 may be either of the type illustrated in FIG. 5 or the type illustrated in FIG. 8.

Referring to FIG. 11, there is shown still another hinge construction where individual support braces are attached to the roll bar 54. As illustrated, a support brace 68 is hinged to the leg member 54b of the roll bar by means of an L-shaped bracket 70. The foot of the bracket 70 is welded or otherwise secured to the leg member 54b and the arm portion of the bracket is pivotally mounted to the support brace 68 by means of a pin 72. Again, it should be pointed out that a support brace similarly secured to the roll bar 54 is required for the second leg member of the roll bar. Mounting pads for the support brace 68 may be any of those shown and described in the various Figures.

Referring to FIG. 12, there is shown a roll bar 74 mounted behind the seat arrangement of an off-the-road vehicle wherein the support brace 76 is shortened to accommodate the construction of the vehicle. As illustrated, the support brace 76 is mounted to the wheel well cover of the vehicle by means of mounting pads, such as the mounting pad 78, and the roll bar is mounted to the vehicle by means of mounting pads, such as the mounting pad 80. The support brace 76 is similar to that illustrated in FIG. 7 although the embodiments of FIGS. 4, 10 and 11 may also be utilized. The mounting pads may be either of the type illustrated in FIG. 5 or the type illustrated in FIG. 8.

Figure 13:
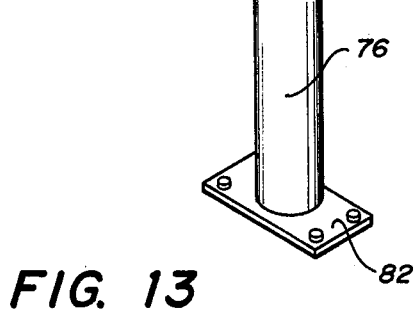
FIG. 13 shows an alternate embodiment of a mounting pad for the support brace of the embodiment of FIG. 6.

Referring to FIG. 13, alternatively the mounting pad may be a flat plate 82 welded or otherwise secured to the end of the support brace 76, which is illustrated in FIG. 13 to include a slight bend to accommodate various vehicle constructions.

While several embodiments of the invention, together with modifications thereof, have been described in detail herein and shown in the accompanying drawings, it will be evident that various further modifications are possible without departing from the scope of the invention.

What is claimed is:

1. A protective guard for a passenger vehicle to be mounted juxtapositioned and transverse of a seating arrangement, the combination comprising:
    a generally U-shaped roll bar pipe section having a top member and two leg members, the leg members including means for mounting said roll bar to the vehicle substantially transverse to the seating arrangement,
    a generally U-shaped support brace pipe section also having a top member and two leg members,
    a hinge of shortened pipe sections having an inside diameter larger than the outside diameter of said support brace for receiving said support brace to pivotally interconnect the top members in a substantially parallel relationship, the shortened pipe sections welded to said roll bar, and
    first and second mounting pads, one pivotally mounted to each of the leg members of said support brace at the end opposite the top member.

2. A protective guard device for a passenger vehicle as set forth in claim 1 wherein said mounting pads include an L-shaped bracket with one arm pivoted to a leg member.

3. A protective guard device for a passenger vehicle as set forth in claim 1 wherein said mounting pads include a U-shaped bracket with the parallel arms pivoted to a leg member.

4. A protective guard device for a passenger vehicle as set forth in claim 1 wherein each leg of said support brace includes means for adjusting the length of each leg.

5. A protective guard device for a passenger vehicle as set forth in claim 1 wherein each leg of said roll bar includes means for adjusting the length of each leg.

6. A protective guard device for a passenger vehicle as set forth in claim 1 wherein the top member of said roll bar and said support brace includes means for adjusting the length of the top member.

* * * * *